United States Patent [19]

Schreiner

[11] Patent Number: 4,742,733
[45] Date of Patent: May 10, 1988

[54] CONTROL SYSTEM FOR AUTOMATIC CHANGE SPEED TRANSMISSION

[75] Inventor: Friedrich Schreiner, Kehlen-Reute, Fed. Rep. of Germany

[73] Assignee: Zahnradfabrik Friedrichshafen, AG., Friedrichshafen, Fed. Rep. of Germany

[21] Appl. No.: 878,982

[22] PCT Filed: Oct. 2, 1985

[86] PCT No.: PCT/EP85/00512
§ 371 Date: May 23, 1986
§ 102(e) Date: May 23, 1986

[87] PCT Pub. No.: WO86/02112
PCT Pub. Date: Apr. 10, 1986

[30] Foreign Application Priority Data

Oct. 4, 1984 [LU] Luxembourg .............. 00302

[51] Int. Cl.⁴ .............................................. B60K 41/04
[52] U.S. Cl. ........................................ 74/866; 74/856
[58] Field of Search ................ 74/856, 866, 752 D, 74/854, 860; 364/424.1

[56] References Cited

U.S. PATENT DOCUMENTS

| | | | |
|---|---|---|---|
| 3,726,159 | 4/1973 | Mizote | 74/866 |
| 3,961,546 | 6/1976 | Gilmore et al. | 74/866 |
| 4,031,782 | 6/1977 | Miller et al. | 74/866 |
| 4,198,882 | 4/1980 | Kiencke et al. | 74/866 |
| 4,414,863 | 11/1983 | Heino | 74/752 A X |
| 4,425,620 | 1/1984 | Batcheller et al. | 74/866 X |
| 4,564,906 | 1/1986 | Stephan et al. | 74/866 X |
| 4,569,255 | 2/1986 | Holmes | 74/866 |
| 4,576,065 | 3/1986 | Speranza et al. | 74/866 |
| 4,584,906 | 4/1986 | Nagaoka et al. | 364/424.1 X |

FOREIGN PATENT DOCUMENTS

| | | |
|---|---|---|
| 0038083 | 10/1981 | . |
| 0107761 | 5/1984 | European Pat. Off. . |
| 0174787 | 9/1985 | . |
| 3337930 | 7/1984 | Fed. Rep. of Germany . |

OTHER PUBLICATIONS

ZF Automatic Gearings HP 500, Description, Operation and Maintenance F 1/12 ZFF 792006, p. 6.

Primary Examiner—Leslie Braun
Assistant Examiner—David Novais
Attorney, Agent, or Firm—Zalkind & Shuster

[57] ABSTRACT

Automatic shift of a gear transmission under speed and load control between high and low drive ratio limits of a shift range, is effected in accordance with different sequential step change shift patterns selected from program storage. Different ones of the available drive ratios between the high and low limits of the shift range are skipped in the various shift patterns respectively corresponding to different travel loading conditions of a vehicle. Automatic shift operation is effected in accordance with the shift patterns selected to reduce the number of drive ratios utilized, such selections being made in accordance with the vehicle travel loading conditions.

15 Claims, 4 Drawing Sheets

|      | i    | A | B | C | D | E | F | G | H | J |
|------|------|---|---|---|---|---|---|---|---|---|
| R.1  | 18,2 |   |   | ● |   |   | ● |   | ● |   |
| R.2  | 7,3  |   |   | ● |   | ● |   |   | ● |   |
| R.3  | 5,1  |   |   | ● |   |   | ● |   |   | ● |
| R.4  | 3,9  |   |   | ● |   |   | ● | ● |   |   |
| N    |      |   |   |   |   |   |   |   |   |   |
| 1.G. | 12,9 | ● |   |   |   |   | ● |   | ● |   |
| 2.G. | 8,45 | ● |   |   |   | ● |   |   | ● |   |
| 3.G. | 6,25 | ● |   |   | ● |   |   |   | ● |   |
| 4.G. | 4,65 | ● | ● |   |   |   |   |   | ● |   |
| 5.G. | 3,58 | ● |   |   |   |   |   |   |   | ● |
| 6.G. | 2,81 | ● |   |   |   |   | ● | ● |   |   |
| 7.G. | 1,84 | ● |   |   |   | ● |   | ● |   |   |
| 8.G. | 1,36 | ● |   |   | ● |   |   | ● |   |   |
| 9.G. | 1,0  | ● | ● |   |   |   |   | ● |   |   |
| 10.G.| 0,8  |   | ● |   | ● |   |   | ● |   |   |

|       | i    |   |
|-------|------|---|
| R.1   | 18,2 |   |
| R.2   | 7,3  | R |
| R.3   | 5,1  |   |
| R.4   | 3,9  |   |
| N     |      | N |
| 1.G.  | 12,9 |   |
| 2.G.  | 8,45 |   |
| 3.G.  | 6,25 |   |
| 4.G.  | 4,65 |   |
| 5.G.  | 3,58 |   |
| 6.G.  | 2,81 |   |
| 7.G.  | 1,84 |   |
| 8.G.  | 1,36 |   |
| 9.G.  | 1,0  |   |
| 10.G. | 0,8  |   |

FIG.4

|   | F1 | F2 | F3 | F4 |
|---|----|----|----|----|
| D | ●  | ●  | ●  | ●  |
| 3 | ●  | ●  | ●  | ●  |
| 2 | ●  | ●  | ●  | —  |
| 1 | ●  | ●  | —  | —  |

FIG.5

CONTROL SYSTEM FOR AUTOMATIC CHANGE SPEED TRANSMISSION

BACKGROUND OF THE INVENTION

This invention relates to a control system for the automatic shift of a step change gear transmission.

Presently known step change gear transmissions for motor vehicles are shifted automatically in dependence on speed, preferably during speed reduction through gearing, and on load conditions as well as the various positions of the fuel controlling gas pedal, such as idling and partial load or full load (kick-down).

It is also known that certain gear ratios of a transmission may be excluded from the shift sequence under selective driver control, for example, under downhill driving conditions. Besides the standard selector control positions for forward travel D, neutral position N and reverse travel R, such selector controls have additional control positions I, II and III, whereby automatic shift of the gearing is correspondingly limited to the first gear ratio, the second ratio or the third gear ratio, as described for example in the brochure, "ZF Automatic Gearings HP 500, Description, Operation and Maintenance F 1/12 ZFF 792006". Such a system offers to the driver the ability to automatically operate a step change gear transmission with relatively fewer gear steps.

In the case of certain multigear-automatic transmissions, not only higher but also lower gear ratios are excluded from the automatic gear shift operation by corresponding displacement of two selector levers to idling and partial travel load positions, respectively. Furthermore, in certain automatic step change gear transmissions, the shift points are changed by means of a preselection control so as to provide more economical performance.

All of such prior art control systems, especially automatic shift controls for multi-speed step change gears, are unable to readily adapt the drive train from the engine to the performance characteristics of the engine so as to achieve favorable fuel economy. In the case of the usual automatic gear control system having relatively few speed ratios, the duration of drive at each speed ratio is prolonged because of the relatively high reduction gear ratios and the wide gear ratio differences between steps thereby reducing the frequency of shift. A different problem arises, however, in the case of multi-speed, automatic gear transmissions with narrow differences between gear ratio steps, as is required for fuel saving operation.

Therefore, it is an object of the present invention to provide an automatic gear shift control system which takes into consideration the small gear ratio differences between shift points of a multi-speed, automatic gear transmission without excessive shifting frequency as a result of the relatively large number of gear ratios involved.

SUMMARY OF THE INVENTION

In contrast to prior art automatic shift types of step change gear transmissions, the system of the present invention effects an automatic shift operation through the entire drive ratio range with less than all of the available gear ratios by the selection of shift patterns so that the automatic shift sequence through the entire shift range between the high and low gear ratio limits occur with jumps or skips in the available gear ratios. It is thereby possible to shift between gear ratios of the entire shift range for different travel loading conditions in a manner heretofore available only during full load operation and high demand travel conditions, excluding for example, hard braking or idle travel conditions wherein less than all of the gear ratios are selected to accommodate such latter travel conditions. The selection of gear ratios in dependence on correspondingly different travel loading conditions automatically changed under different shifting patterns results in a considerable decrease in frequency of shifting without limiting the optimum adaptation of the transmission to the corresponding state of travel and to the performance characteristics of the engine most favorable to economical fuel consumption.

In a particularly simple manner, it will be possible in accordance with the present invention to determine the state of travel and travel loading condition by detecting the change of acceleration because this parameter is influenced by all factors which are capable of acting on the drive train of a vehicle. The speed measurement from the drive train transmitted to the electronic control unit may therefore be utilized as was heretofore customary. The duration of the change of acceleration calculated from the measurement of speed of the reduction gear train is particularly advantageous because all of the speed ratio shifts need not be taken into consideration. Also, the change of acceleration may be simply determined by calculation from measurement data received during a fixed program, such data being stored for a predetermined duration of time. The value of the stored data is then compared with the reference acceleration values. Several shifting sequences are therefore available as control patterns, the selection of which is accomplished in accordance with the state of travel. At the time the shifting sequence is determined, its corresponding shift pattern overrules the speed dependent shift point operation under the previous shift pattern just changed.

Between two states of travel deviating only slightly one from the other, the dependence on load may be significant for the selection of the shift patterns so that such load dependency is also included in the selection criteria for change in the shift pattern besides the change in acceleration. Where there is an abrupt and severe change in acceleration, occurring for example during full braking, it is possible that a shift pattern in which most gear ratios are deleted, will not in itself provide optimum adaptation. Therefore, an additional pattern may advantageously incorporate no fixed sequence of speeds at all, but rapid shift to neutral and then into the speed ratio which corresponds to momentary speed measurement.

For starting conditions, a corresponding shift pattern may be preselected to provide starting in third or fourth gear for example, since acceleration change cannot influence shift pattern selection during start from standstill.

Several speed ratios may be assigned to each of the select control positions aforementioned, especially the forward travel position D, while the limitation of the speed ratio positions 1 and 2 is assigned to an additional selector control position I. It will also be possible to assign positions to the selector control for reverse travel which provides additional reverse speeds. Finally, it will be possible to prevent altogether certain shift patterns by other selector control positions.

According to the present state of the art, acceleration is measured to determine shift points besides the use of torque in the shifted gear transmission and driven speed. Also, the shift points are determined for all speed ratios of the automatic gear transmission by comparison of stored theoretical data with the determined actual measured data in accordance with the prior art. The selection of speed ratios to establish the different shifting sequences is not suggested, however, by such prior art teachings.

BRIEF DESCRIPTION OF THE DRAWING FIGURES

Further details of the invention will be explained on the basis of an embodiment by way of example and on the basis of the accompanying drawings.

FIG. 4 is a diagram of the speed ratios to which automatic shift is limited, corresponding to the positions of the selector control.

FIG. 5 is a table showing the shift patterns corresponding to the selector control positions limiting gear shift.

DETAILED DESCRIPTION OF PREFERRED EMBODIMENT

Figures 1, 2:
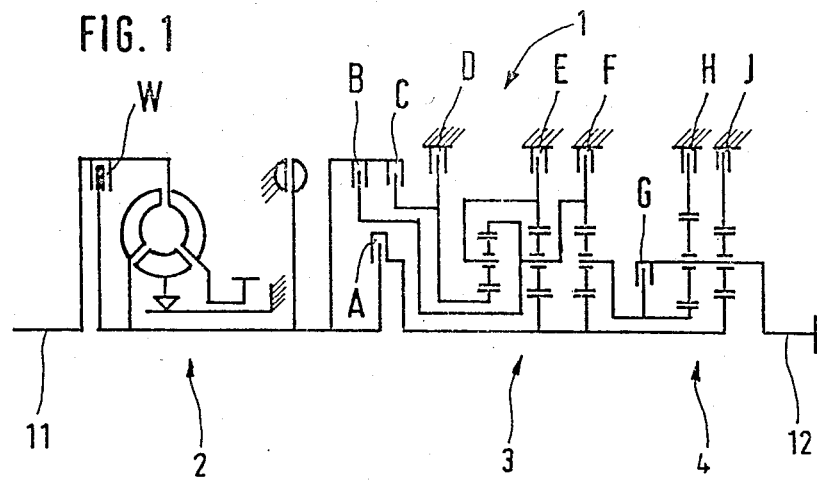
FIG. 1 shows a hydrodynamic, step change gear transmission for vehicle propulsion with ten possible forward speed ratios.
FIG. 2 is a table denoting the clutches and brakes engaged for the respective speed ratios and the overall transmission drive ratio achieved during each speed ratio for the step change gearing shown in FIG. 1.
Figure 6:
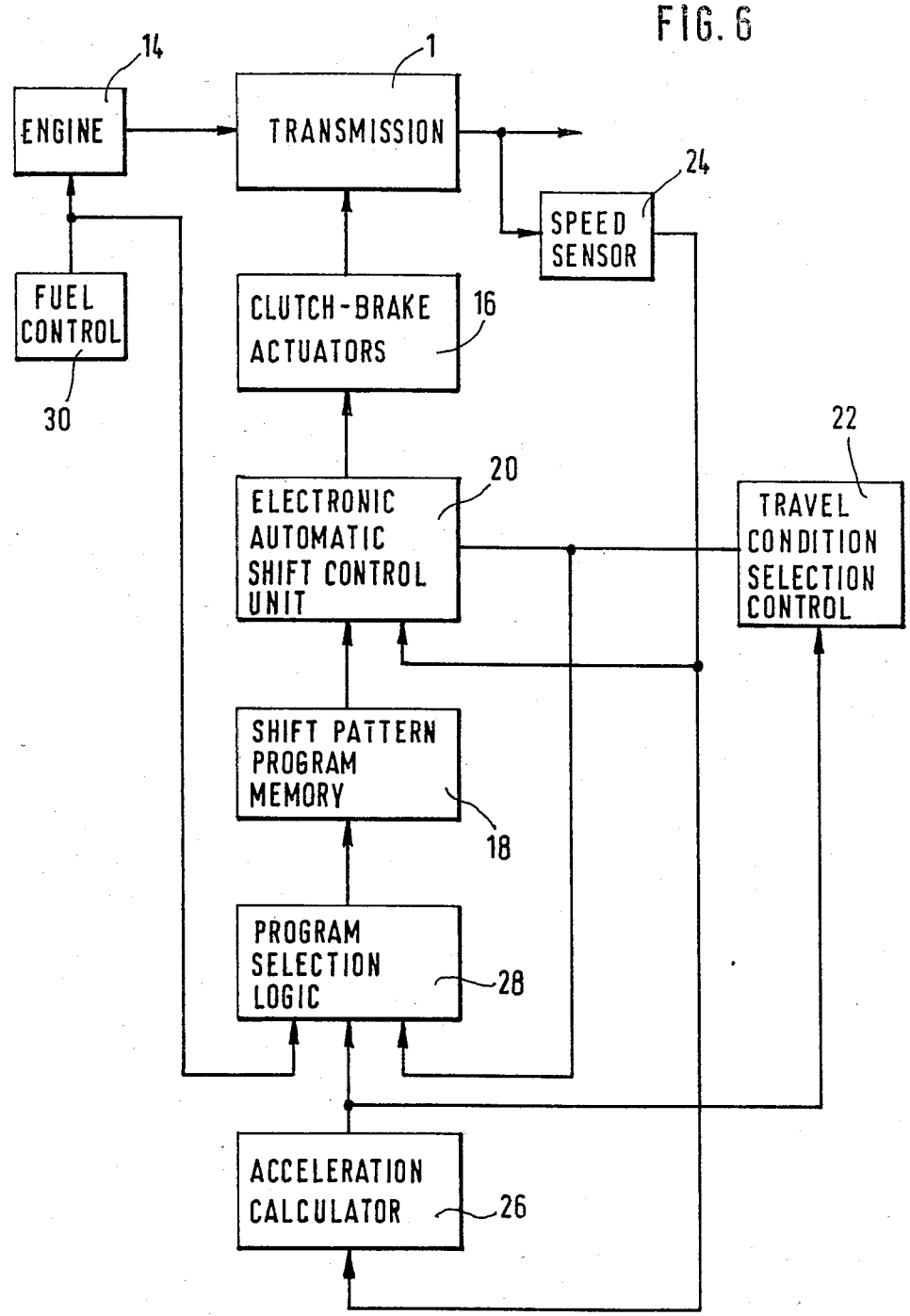
FIG. 6 is a block diagram showing the drive ratio control system to which FIGS. 1-5 relate.

In the embodiment shown in FIGS. 1 and 6, an automatically shifting, step change gear transmission 1 of a hydrodynamic type for vehicle wheel propulsion, is connected to an engine 14. The transmission 1 consists of a hydrodynamic torque converter 2, main gearing 3 and supplemental gearing 4. Because of the multi-speed ratio of the step change gear transmission, the hydrodynamic torque converter may be replaced by a hydrodynamic coupling. While the transmission of the embodiment shown is shifted in drive ratio without torque interruption, such automatic shifting may be applicable to a gear reducer type of transmission having torque interruption because of small differences between gear ratios resulting in small speed differences between the shift points.

Figure 3:
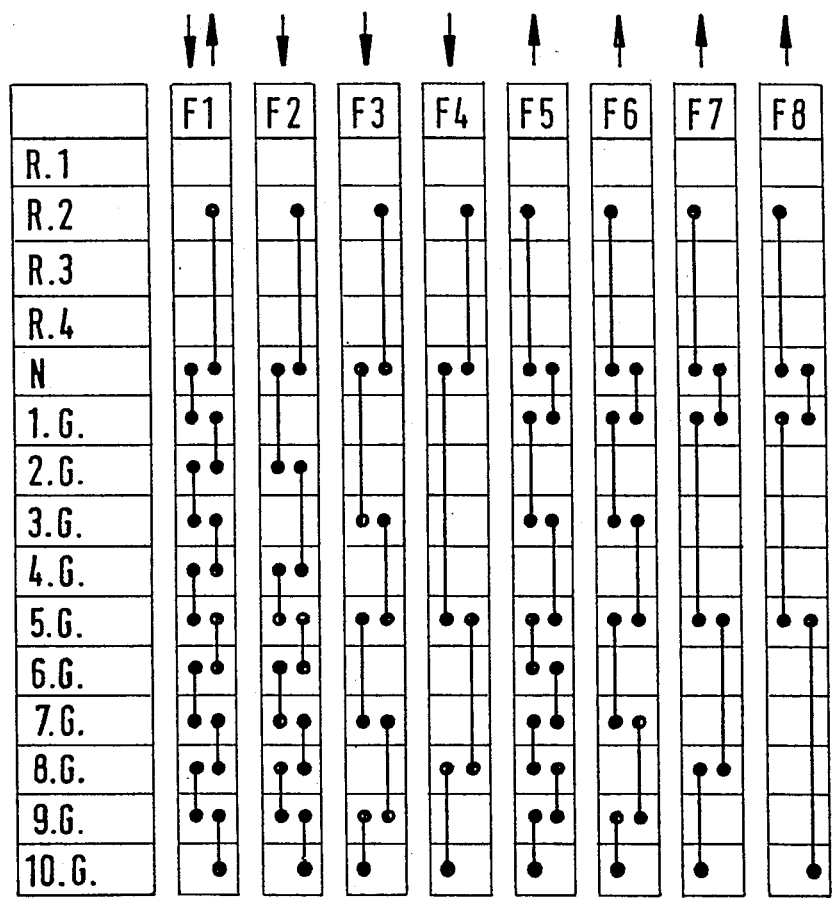
FIG. 3 is a diagram of the shift patterns for the gearing shown in FIG. 1.

From the table of FIG. 2, the individual speed ratios (i) are identified with the clutches and brakes of the transmission engaged by actuators 16 as diagramed in FIG. 6. In FIG. 3, the shift patterns F1 to F8 are shown. The shift pattern F1 includes high and reverse gear shift ratios according to the present state of the prior art, wherein shift occurs from one speed ratio to another speed ratio depending on speed and on the load. The shift patterns F2 to F4 include only the higher drive ratios and in the case of the pattern F2, the speed ratios 1 and 3 are excluded from the automatic shift sequence. In the case of pattern F3, the speed ratios, 1, 2, 4, 6, 8 and in the case of pattern F4, the speed ratios 1-4, 6, 7 and 9 are skipped or jumped. In the case of the patterns F5 to F8, a downshift operational mode is shown wherein pattern F5 corresponds to a full step downshift between the speed ratios 10 and 5 while downshift from fourth to second speed ratios are skipped. The automatic downshift sequences of patterns F6 to F8 may easily be recognized from FIG. 3 and require no further explanation. The foregoing shift patterns F1-F8 may be stored in a program memory 18 associated with the electronic control unit 20 as diagramed in FIG. 6.

FIG. 4 shows schematically a possible arrangement of positions for a selector control 22, diagramed in FIG. 6 for the multi speed gearing 1. In the position D, automatic shift covers all forward speed ratios. In the position 1, the speed ratios 3-10 are excluded; in the position 2, the speed ratios 5-10 are excluded; and in the position 3 the speed ratios 7-10 are excluded from the automatic shift operation in order to limit the shift operation to high gear ratios in a manner already known for downhill travel.

While the shifting limitations of the shift patterns eliminates or skips certain speed ratios, shift takes place automatically in dependence on the state of travel and is manually preselected only in exceptional cases, as for example, in the case of starting. The selector control is operated manually to establish the limits of the speed ratios to which the transmission is shifted automatically. As an example, one may utilize a selector control to limit the speed ratio as described in detail in German Pat. No. P3337930. The latter selector control may exclude the lower as well as the upper speed ratios from any automatic shifting operation.

The selector control 22 as diagramed in FIG. 6, also influences the selection and readout of a shift pattern program from memory 18 through selection logic 28 so that in the position 1 of the selector control lever, two shift patterns F3 and F4 are excluded while in the selector control position 2 shift pattern F4 is excluded as shown in FIG. 5.

The control system for automatic shift of the step change gear transmission 1 will be explained by way of example on the basis of selected states of travel loading the transmission:

Travel on a Mountain Road With High Load

Selector control lever 22 diagramed in FIGS. 4 and 6, is placed in position D corresponding to a double lever position. In the case of a high load and a high demand on performance, the shift pattern F1 is a logical selection made through the selection logic 28 associated with the electronic unit 20 shown in FIG. 6. Thus, in the case of relatively small acceleration changes, all forward speed ratios are available in either direction of shift to accommodate the steepness of travel.

Transition on a Steep Mountain Road With High Load

Because of the relatively high negative acceleration change, the selection of patterns F5 to F8 occurs in dependence on road steepness. In the case of a very severe incline, for example, pattern F8 is automatically selected causing downshift immediately from the 10th to the 5th gear ratio and further down to the first gear ratio. Where a low negative acceleration change occurs, pattern F6 is selected so that only the speed ratios 8, 6, 4 and 2 are skipped.

Level Travel With a High Load

In this travel loading condition, one would possibly select pattern F2 or F3, wherein the shift pattern F2 is comparable to an 8-speed transmission and the pattern F3 is comparable to a 5-speed transmission.

Travel Condition With Little Load

Because of severe changes in acceleration in the case of upshift, a shift pattern with few speed ratios such as F3 and F4, are selected. In the case of required downshift on mountain roads, shift pattern F5 or F6 is selected.

Starting Condition

The selector control 22 is supplemented for example, by the shift pattern F1 to F4 so that it will be possible to start in first, second, third as well as in the fifth speed ratio. Double lever selector control positions may be used to fix each speed ratio as a starting speed. Furthermore, it is also possible to establish the shift pattern F3 as a starting pattern, that is, the third speed ratio as a starting speed. Desired starting in the first or second speed ratio will then have to be fixed by the selector control 22.

Through shift pattern selection logic 28, the foregoing shift patterns stored in the memory 18 associated with the electronic unit 20, are always related to acceleration changes so that it will also be possible to relate the shift pattern selection to load. Further, change in shift points for each shift pattern still depends on speed measurement through speed sensor 24 as shown in FIG. 6.

While the state of travel of the vehicle at any instant, is derived from the change of acceleration determined for the drive train, through calculator 26 as diagramed in FIG. 6, due consideration must also be given to the output of engine 14 which is in turn dependent on the position of its fuel controlling gas lever 30. The engine loading factor is thereby introduced into the selection of the shift pattern to accord the driver a strong influence over such selection. One could utilize the positions of the gas pedal lever, such as partial load, full load and kick-down as an indication of the state of the load.

I claim:

1. In combination with a gear transmission (1) having a predetermined number of drive ratios (R1–R4, 1G–10G) established during automatic shift between high and low drive ratio limits in a predetermined step change sequence, a method of modifying said automatic shift to accommodate different loading conditions of the transmission, including the steps of:
    storing a plurality of programs (F1–F8) corresponding to different sequential step change patterns of shift between said high and low limits respectively assigned to different loading conditions;
    determining which one of the loading conditions the transmissio is in;
    selecting one of the stored programs assigned to the determined one of the loading conditions of the transmission; and
    skipping some of the drive ratios during said automatic shift between said high and low limits in accordance with the selected one of the programs to reduce the predetermined number of the drive ratios utilized in dependence on the loading conditions.

2. The method of claim 1, wherein said different step change patterns are formed by elimination of different drive ratios from the predetermined step change sequence.

3. The method of claim 2 wherein the step of: determining the loading condition includes continuously detecting changes in acceleration.

4. The method of claim 3 wherein the acceleration is determined by instantaneous analog measurement.

5. The method of claim 1 wherein the step of: determining the loading condition includes continuously detecting changes in acceleration.

6. The method of claim 5, wherein the acceleration is determined by instantaneous analog measurement.

7. The combination of claim 1 wherein said drive ratios include both forward and reverse speeds, and said step of skipping of the drive ratios is limited to the forward speeds (1G–10G).

8. The combination as defined in claim 7 including means responsive to changes in acceleration corresponding to the loading conditions for selecting said one of the different step change paterns from the storing means.

9. The combination as defined in claim 8 wherein the acceleration is determined from analog speed measurement.

10. The combination as defined in claim 9 wherein said loading conditions include low and high load travel.

11. In combination with a gear transmission (1) for a vehicle having a plurality of drive ratios (R1-R4, 1G-10G) arranged in a predetermined step change sequence between high and low limits of a shift range, a system for automatic change in the drive ratios of the transmission through said shift range dependent on vehicle speed and loading and for selectively limiting change in the drive ratios, the improvement comprising the steps of:
    storing a plurality of different step change patterns (F1–F8) respectively having some of the drive ratios of said predetermined step change sequence eliminated;
    determining travel conditions of the vehicle; and
    modifying the automatic change in the drive ratios through said shift range in accordance with a selected one of the different step change patterns to decrease the number of the drive ratios utilized during the automatic change.

12. The improvement as defined in claim 11 wherein changes in acceleration of the vehicle determines the vehicle travel condition corresponding to said one of the different step change patterns.

13. The improvement as defined in claim 12, wherein said different states of vehicle travel condition include low and high load travel.

14. The improvement as defined in claim 12 wherein acceleration is determined from analog speed measurement of the vehicle.

15. In a control system for automatic shift of a gear transmission through a predetermined shift range between high and low limits of drive ratios in accordance with stored shift patterns having shift points varied in dependence on load and speed, and wherein said high and low limits of the drive ratios are selectively excluded and drive is selectively limited to either forward or reverse directions, the improvement comprising the steps of:
    determining loading conditions of the transmission;
    assigning the stored shift patterns to the respective loading conditions to obtain optimum performance of the transmission under the respective loading conditions during said automatic shift through the predetermined shift range, said shift patterns (F1-F8) being respectively limited to different numbers of the drive ratios through programmed skipping of some of the drive ratios in said shift range; and
    selecting one of the assigned shift paterns for said automatic shift of the transmission under the correspondingly determined loading conditions to decrease the number of the drive ratios through which the transmission is automatically shifted, in dependence on the loading conditions.

* * * * *